United States Patent
Wu

(10) Patent No.: US 7,963,676 B2
(45) Date of Patent: Jun. 21, 2011

(54) REFLECTOR WINDOW FOR USE IN A LIGHT LAMP

(76) Inventor: Kuohua (Angus) Wu, Tucson, AZ (US)

( * ) Notice: Subject to any disclaimer, the term of this patent is extended or adjusted under 35 U.S.C. 154(b) by 723 days.

(21) Appl. No.: 11/585,603

(22) Filed: Oct. 23, 2006

(65) Prior Publication Data

US 2008/0094840 A1 Apr. 24, 2008

(51) Int. Cl.
*F21V 13/08* (2006.01)
*F21V 9/00* (2006.01)

(52) U.S. Cl. ......... 362/293; 362/307; 359/580; 359/590

(58) Field of Classification Search .................. 359/580, 359/584, 586, 588, 589, 590, 838, 883, 884; 362/339, 600–631

See application file for complete search history.

(56) References Cited

U.S. PATENT DOCUMENTS

| | | | |
|---|---|---|---|
| 4,592,622 A | 6/1986 | Hashimoto et al. | |
| 4,831,307 A | 5/1989 | Takenaka et al. | |
| 5,824,023 A | 10/1998 | Anderson | |
| 5,882,774 A * | 3/1999 | Jonza et al. | 428/212 |
| 6,101,032 A * | 8/2000 | Wortman et al. | 359/500 |
| 6,238,065 B1 * | 5/2001 | Jones | 362/339 |
| 6,331,710 B1 | 12/2001 | Wang et al. | |
| 6,350,034 B1 | 2/2002 | Fleming et al. | |
| 6,436,541 B1 | 8/2002 | Sopko et al. | |
| 6,456,437 B1 * | 9/2002 | Lea et al. | 359/625 |
| 6,552,846 B1 | 4/2003 | Suzuki | |
| 6,698,909 B2 * | 3/2004 | Jones | 362/339 |
| 6,768,581 B1 | 7/2004 | Yip et al. | |
| 6,813,096 B2 | 11/2004 | Ohta | |
| 6,921,578 B2 | 7/2005 | Tsujino et al. | |
| 7,009,746 B2 | 3/2006 | Hatakeyama et al. | |
| 7,164,535 B2 * | 1/2007 | Hall et al. | 359/581 |
| 2005/0078375 A1 | 4/2005 | Hall et al. | |
| 2006/0082693 A1 | 4/2006 | Huang et al. | |

OTHER PUBLICATIONS

Optical Coating, Wikipedia, the free encyclopedia.

* cited by examiner

*Primary Examiner* — Anabel M Ton

(57) ABSTRACT

A reflector window includes a light transmission window having a center and an outer edge and an optical coating of at least first and second materials having differing refractive indices deposited on a proximate side of the light transmission window. The optical coating includes a plurality of alternating layers of the first and second materials with each layer having a thickness which increases from the center to the outer edge of the light transmission window.

23 Claims, 4 Drawing Sheets

# REFLECTOR WINDOW FOR USE IN A LIGHT LAMP

CROSS REFERENCE TO RELATED APPLICATIONS

The following application are hereby incorporated by reference: application Ser. No. 11/247,539, filed Oct. 11, 2005, entitled: "Reflector"; application Ser. No. 11/176,028, filed Jul. 6, 2005, entitled: "Bandpass Reflector with Heat Removal"; application Ser. No. 11/179,117, filed Jul. 12, 2005, entitled: "IR Absorbing Reflector"; and application Ser. No. 11/262,195, filed Oct. 28, 2005, entitled: "Cool Light Source".

BACKGROUND

Many projection systems and other imaging devices incorporate high intensity arc-light sources that have small point sources that are called "fireballs." The fireball is usually located within a concave reflector that has a focal point, such as a parabolic, elliptical, or other shaped mirror. The light emanating from the fireball in the focal point is reflected off the surface of reflector. Often times the reflector is made of a glass, metal, or other substrate that requires a special coating to be applied to provide a specular surface for reflection. For instance, a silver reflector coating may be applied to the reflector to reflect all wavelengths of visible, infra-red (IR), and ultra-violet (UV) radiation.

Often times the light source may need to supply only a limited band of frequencies, such as visible light in video projection systems. For instance, a xenon lamp typically emits about 68% of its emissions in the UV and IR radiation and these unwanted emissions may need to be filtered out. Other applications may only require a band of UV radiation such as in semiconductor lithography. Still other applications may simply require a band of IR, such as with thermal imaging.

Because various applications only require a portion of the light source radiation, a "cut" or absorption filter can be placed in the optical path of the light source to absorb the unwanted wavelengths to prevent other optical components from being damaged. Typically, this cut filter needs to be cooled effectively to prevent other optical components from being damaged. This cut filter may also need to be cooled effectively to prevent degradation such as clouding which might affect the performance of the desired transmitted radiation and the optical function of filter, such as the reflection or transmission degradation, filter spectrum shift, filter adhesion failure, etc.

BRIEF DESCRIPTION OF THE DRAWINGS

The invention is better understood with reference to the following drawings. The elements of the drawing are not necessarily to scale relative to each other. Rather, emphasis has instead been placed upon clearly illustrating the invention. Furthermore, like reference numerals designate corresponding similar though not identical parts through the several views.

DETAILED DESCRIPTION OF EXAMPLE EMBODIMENT(S)

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention, as represented in FIGS. 1 through 4, is not intended to limit the scope of the invention, as claimed, but is presented for purposes of illustration only and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Figure 1:
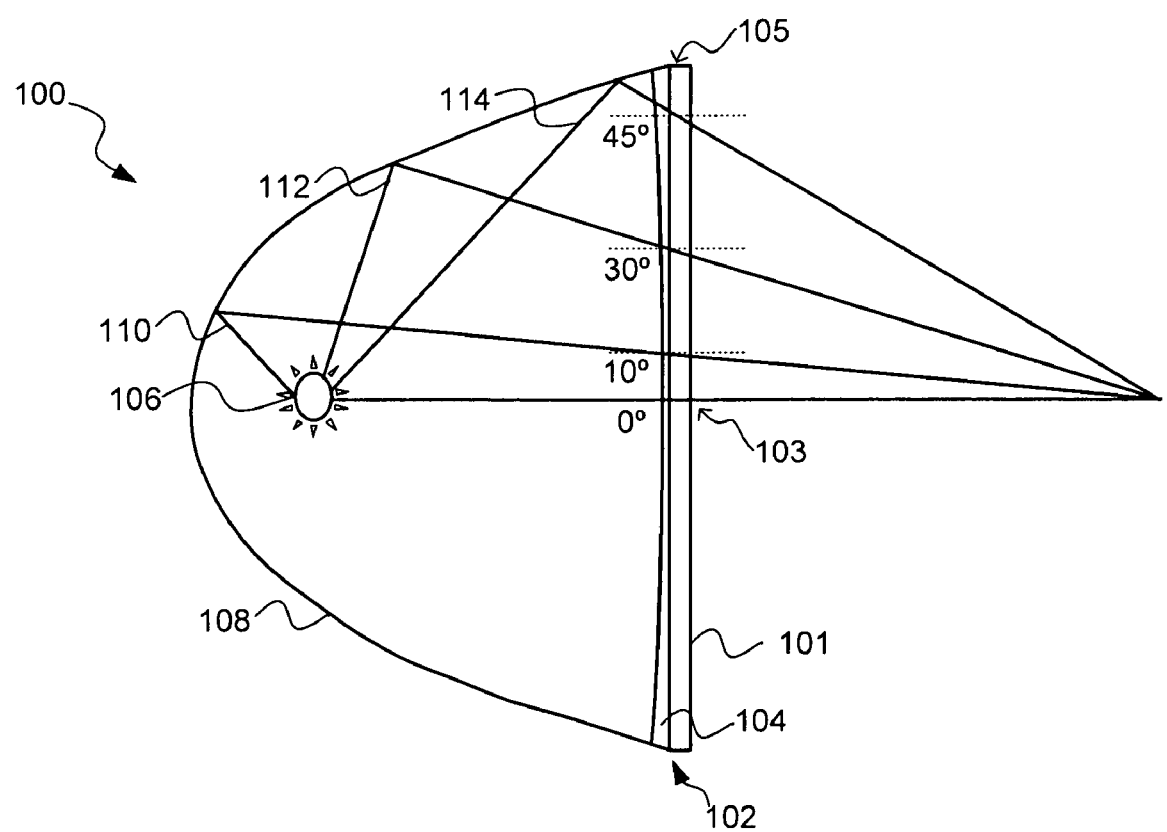
FIG. 1 is a cross-sectional view of a lamp light in accordance with an embodiment of the present invention.

As illustrated in FIG. 1, a light lamp 100, in an example implementation in accordance with the invention includes a reflector window 102. The reflector window includes a light transmission window 101, having a center 103 and an outer edge 105, and an optical coating 104. The optical coating is included on the proximate side of the light transmission window adjacent a light source or fireball 106. The optical coating can be comprised of a plurality of alternating layers of the first and second materials. Each of these layers has a thickness which increases from the center to the outer edge of the light transmission window.

The fireball 106 may comprise one of any number of standard lamps such as, for example, a tungsten-halogen lamp, a xenon lamp, a mercury arc lamp, or any other light generating source. Such lamps typically produce electromagnetic radiation in the UV portion (i.e. wavelengths between 10 nm-400 nm), the visible portion (i.e. wavelengths between 400 nm-750 nm), and the IR portion (i.e. wavelengths between 750 nm-20,000 nm) of the electromagnetic spectrum. While radiation from the visible portion is desirable to enhance the color and brightness of the projected image on screen 54, the UV and IR radiation can damage sensitive equipments, such as color wheels, lenses and other associated equipment.

The concave reflector 108 can be included with the reflector window and fireball. The reflector preferably includes a semi-elliptical concave cavity. An ellipse has two focus points and any ray depart from first focus point will collect at the second focus point. The fireball is usually positioned at the first focus point of elliptical reflector. The output of fireball will then focus through the reflector window to a second focus point. An integrate rod can be positioned at this second focus point to collect the light.

Due to the semi-elliptical shape of the reflector 108, the incident angle of radiation upon the optical coating 104 of the reflector window 102 from the fireball increases over a range of incident angles from the center 103 to the outer edge of the reflector 105. This is shown in FIG. 1, wherein a first beam of radiation 110 exits near the center of the reflector window 102 at an angle of 10-degrees. A second beam of radiation 112 incidents the reflector window at a further radial distance from the center 105 at an angle of 30-degrees, and a third beam of radiation 114 incidents the reflector window nearer to the outer edge 105 at an angle of 45-degrees. Accordingly the thickness of the optical coating is increases from the center to the outer edge of the reflector window. The term "incident angle" as employed herein refers to the deviation of the incident radiation from a reference line 116 normal (perpendicular) to the reflector window's surface.

According to one embodiment of the present invention, the reflector 108 can include a special coating that is designed with a band reflection layer to reflect wavelengths of a desired bandwidth towards the reflector window 102 and pass through at least partially the undesired wavelengths to an absorption layer to be absorbed, as will be apparent to one of skill in the art. As such, when the reflector window is designed to transmit the visible portion of the electromagnetic spectrum, the non-transmitted UV and IR radiation can be continuously reflect back to reflector till it is absorbed by reflector coating. Additionally, a heat sink or other cooling device can be included on the light lamp 100.

According to one embodiment of the present invention, as will be described in greater detail below, the optical coating 104 comprises a plurality of alternating layers of a high refractive material and a low refractive material, wherein each of the alternating layers increases in thickness from generally the center 103 to the outer edge 105 of the light transmission window 101 such that a transmitted bandwidth for electromagnetic radiation incident upon the optical coating at each incident angle within a range of incident angles from generally the center to the outer edge is substantially equal to a predefined portion of the electromagnetic spectrum. Because of the optical path change, where light is incident on the reflector window at higher incident angles the transmission band of reflector window is shifted down and transmission bandwidth shrinks The deficiencies of both the bandwidth shift and shrinkage can be compensated by increasing the thickness of each layer of film where light is incident at higher angles to minimize the transmission loss. In one exemplary embodiment, the optical coating comprises alternating layers of titanium dioxide ($TiO_2$) and silicon dioxide ($SiO_2$). In general high index materials can include materials such as: TiOx, TaOx, NbOx, ZrOx, HfOx, and the like. Low index materials can include materials such as: SiO2, CaF2, Al2O3, BaF2, MgF2, and the like.

In one embodiment, the thickness of each of the alternating layers of the optical coating 104 increases linearly from center 103 to the outer edge 105 of the light transmission window 101 based on the angle of incidence of the electromagnetic radiation.

In another embodiment, the thickness of each of the alternating layers increases non-linearly from generally the center of the light transmission window 101 to its outer edge. In one exemplary embodiment the thickness of each of the alternating layers increases linearly such that each alternating layer is, for example, approximately 7 percent thicker at the outer edge than at the center. In one exemplary embodiment, each of the alternating layers is thicker at the outer edge than at the center by a percentage within a range of percentages from approximately 2 percent to approximately 20 percent.

As a result of gradually increasing the thickness of each of the alternating layers from generally the center 103 to the outer edge 105, the optical coating 104 has a wedge-like cross-section, with a thick end of the wedge at the outer edge and a thin end of the wedge at the center. By employing a wedge-like coating in accordance with the present invention, the reflector window provides a transmission bandwidth for electromagnetic radiation at each incident angle within a range of incident angels upon the reflector window that is substantially equal to a predetermined portion of the electromagnetic spectrum. As such, when the predetermined portion of transmitted electromagnetic radiation is within the spectrum of visible light, the reflector window can improve brightness and equalize the color the transmitted light, without transmitting the potentially harmful UV and IR radiation.

Figure 2:
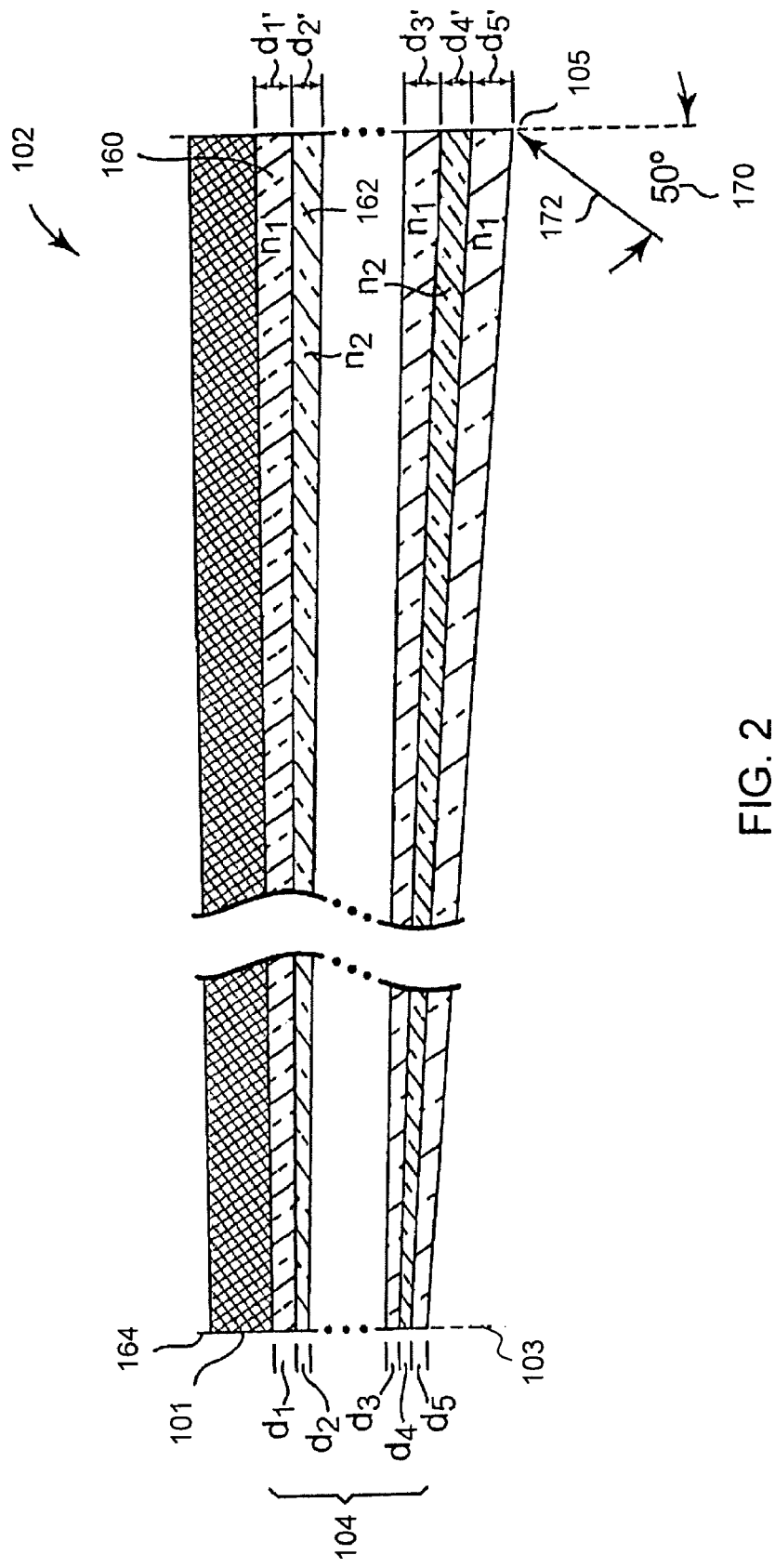
FIG. 2 is a cross-sectional view of the reflector window of FIG. 1, according to one embodiment of the present invention.

Additionally, gradually increasing the thickness of layers of the optical coating 104 in accordance with the present invention requires fewer layers and less volume of dielectric materials than employed by conventional reflectors to improve brightness and equalize color transmission of visible light. As such, wedge-coating techniques in accordance with the present invention are less costly to implement FIG. 2 shows a longitudinal cross-section through a portion of the reflector window 102 of FIG. 1 illustrating one embodiment of optical coating 104 in accordance with the present invention. In one embodiment, the optical coating 104 includes a plurality of alternating layers of a first material 160 having a refractive index $n_1$ and a second material 162 having a refractive index $n_2$ deposited on the light transmission window 101. In one embodiment, the light transmission window comprises glass. In one embodiment, refractive index $n_1$ of the first material is greater than the refractive index of the second material. In one exemplary embodiment, the first material comprises $TiO_2$ having a refractive index $n_1$ of approximately 2.38 and the second material comprises $SiO_2$ having a refractive index $n_2$ of approximately 1.46.

In one embodiment, the thickness of each of the alternating layers increases linearly from the center 103 of the light transmission window 101 to the outer edge 105 of the light transmission window where an angle of incidence 170 of radiation 172 is approximately 50 degrees.

In another embodiment, the thickness of each of the alternating layers increases non-linearly from the center 103 of the light transmission window 101 to the outer edge 105 of the light transmission window. In one exemplary embodiment each layer increases non-linearly from the center to the outer edge. As such, the dimensions d1', d2', d3', d4', d5' of each layer at the outer edge are, for example, approximately 7 percent greater than their corresponding dimensions d1, d2, d3, d4, d5 at the center. In one embodiment each layer of the first material has the same thickness (e.g. d1=d3=d5 and d1'=d3'=d5') and each layer of the second material has the same thickness (e.g. d2=d4 and d2'=d4'). In other embodiments, however, the thicknesses of each layer of first material and the thicknesses of each layer of second material need not be equal.

Optical coating can be formed on the light transmission window 101 using conventionally thin-film deposition techniques commonly know to those skilled in the art. For example, in one embodiment, a sputtering deposition process can be employed to form the alternating layers of optical coating 104 on the light transmission window. Sputtering generally involves knocking atoms from a "target" by bombarding the target with ions from a plasma (usually a noble gas, such as Argon). Typically, a small amount of a non-noble gas, such as oxygen, is mixed with the plasma forming gas. Atoms "sputtered" from the target react with the gas mixture to form an oxide of the target material which is subsequently deposited on a desired surface (i.e. the light transmission window) to form the optical coating. The wedge-like profile of the layers of optical coating can be achieved by adjusting various factors associated with the sputtering process such as, for example, the distance between the target and the light transmission window, the tilt angle of window relative to target, the pressure of deposition, the amount of oxygen in the plasma, the amount of ion source, and the power provided to the target material.

In another embodiment, evaporation deposition techniques can be employed to form the alternating layers of the optical coating 104 on the light transmission window 101. Evaporation deposition generally involves evaporating a metal source with an ion beam which is steered into the metal source using a magnetic filed. The evaporated metal is then deposited on a desired surface, such as the light transmission window. The wedge-like profile of the layers of optical coating can be achieved by adjusting various factors associated with the evaporation process such as rotation of the light transmission window relative to the metal source, masking the metal source and/or light transmission window, and control of the ion beam, gas flow, and evaporation rate. For example, a mask having a pie-shaped wedge cut out at, for example, a thirty degree angle could be used to mask a rotation light transmission window. By varying the speed of rotation and the angle of the pie-shaped wedge the thickness and thickness increase can be controlled. Further, the relative angle of the rotating mask can be adjusted so as to position the rotating mask at and angle from the source.

In another embodiment, chemical vapor deposition (CVD) techniques can be employed to form the alternating layers of optical coating 104 on the light transmission window 101. CVD generally involves heating a substrate, such as the light transmission window, and transporting high vapor pressure gaseous compounds of materials to be deposited to the substrate surface. The gaseous compounds react and/or decompose on the substrate surface to produce the desired deposit. Gas fed from outer edge and the suction hose at the center of window will produce the wedge shape film. By varying the gas feed rate, the suction rate, the position and height of hoses the thickness of the wedge can be adjusted.

Various software programs are available to assist in calculating the number of desired layers, the number of different materials and the thickness or each respective layer as well as the type of materials to be deposited. These programs include "The Essential Macleod" from Thin Film Center Inc., "TFCalc" from Software Spectra Inc., and "Optilayer" from Optilayer Ltd. By utilizing these programs one skilled in the art can effectively calculate the desired number of materials, layers, as well as their relative thicknesses. These software programs can therefore be used to customize a reflector window to transmit a desired, predetermined portion of the electromagnetic spectrum.

Figure 3:
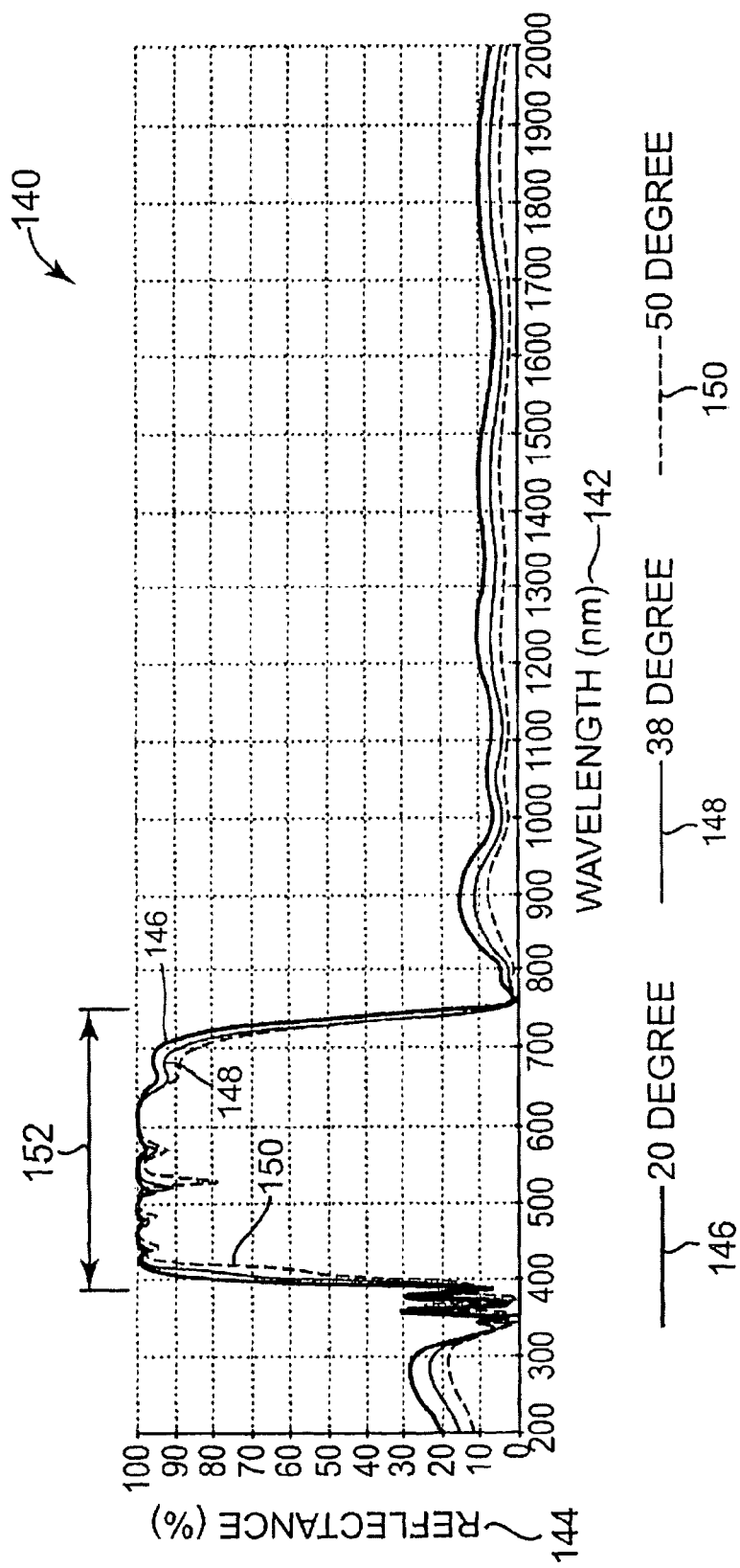
FIG. 3 is a graph illustrating the transmission performance of the reflector window of FIG. 2 according to one embodiment of the present invention.

FIG. 3 is a graph 140 illustrating the transmitted performance of the exemplary embodiment of the reflector window 102 as described with reference to FIGS. 1 and 2. The wavelength of incident radiation from a light source, such as the fireball 106, is illustrated along the x-axis, as indicated at 142, and the transmission of the reflector window 102 is illustrated along the y-axis, as indicated at 144. A first curve 146 illustrates the transmission at an incident angle of approximately 10 degrees, a second curve 148 illustrates the transmission of radiation at an incident angles of approximately 30 degrees, and a third curve 150 illustrates the transmission of radiation at an incident angle of approximately 45 degrees. As illustrated by graph 140, a transmitted bandwidth 152 at each of the three illustrated angles of incidence (i.e. 10, 30, and 45-degrees) is approximately equal to the bandwidth of the visible portion of the electromagnetic spectrum. In another embodiment the optical coating 104 can be configured to provide a transmitted bandwidth at each of these three angles that is approximately equal to another, predetermined bandwidth, such as IR radiation or UV radiation.

As such, by increasing the thickness of each of the alternating layers of optical coating 104 from generally the center to the outer edge of the light transmission window 101, the transmitted bandwidth for all angles of incidence within a desired range of incident angles are substantially equal to a predefined portion of the electromagnetic spectrum. In one embodiment the desired range of incident angles is from approximately zero degrees to approximately fifty degrees. In another embodiment the desired range of incident angles can be from approximately zero degrees to an angle larger than fifty degrees, as will be apparent to one of skill in the art.

Figure 4:
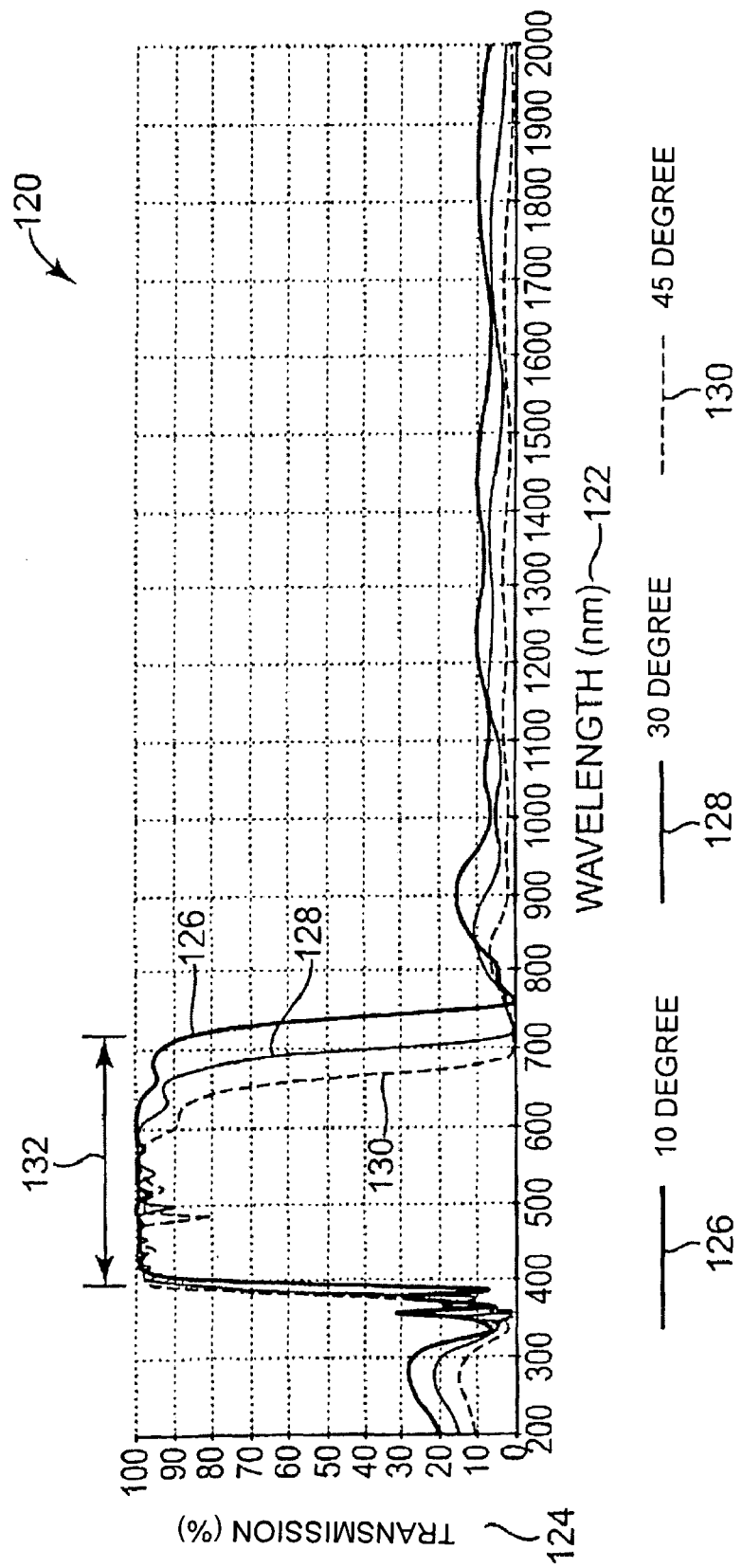
FIG. 4 is a graph illustrating the transmission performance of a reflector constructed according to one conventional technique.

For comparison, FIG. 4 illustrates the transmitted performance of a reflector window having similar optical coating to that for FIG. 3, except that each of the alternating layers has a uniform thickness and does not increase form the center to the outer edge of the reflector window. This is shown on graph 120. The wavelength of incident radiation from a light source is illustrated along the x-axis, as indicated at 122, and the transmission of the reflector window is illustrated along the y-axis as indicated at 124. A first curve 126 illustrates the reflectance of radiation at an incident angle of approximately 10-degrees, a second curve 128 illustrates the reflectance of radiation at an incident angle of approximately 30-degrees, and a third curve 130 illustrates the reflectance of radiation at an incident angle of approximately 45-degrees.

As illustrated by graph 120, while curve 126 corresponding to radiation at an incident angle of 10-degrees has a transmitted bandwidth 132 which is approximately equal to the bandwidth of the visible light, the transmitted bandwidth decreases and shifts to UV region with increasing angle of incidence. In this implementation, the transmitted bandwidth for radiation at an incident angle of 30-degrees ranges from approximately 390 nm to only 690 nm, while the transmitted bandwidth for radiation at an incident angle of 45-degrees ranges from approximately 380 nm to only 650 nm, both of which are less than the bandwidth of visible light. As illustrated by graph 120, the transmitted bandwidth decreases as the angle of incidence increases, resulting in unequal color reflectance and a loss of brightness in a projected image.

Although described and illustrated herein as being configured to have a transmitted bandwidth of approximately visible light, the transmitted bandwidth can be calculated and implemented to transmit any predetermined bandwidth, such as primarily the IR or UV spectrum. Furthermore, although described primarily in terms of $TiO_2$ and $SiO_2$, the optical coating may comprise any suitable combination of high and low refractive index dielectric materials. Examples of other suitable high refractive index dielectric materials include tantalum oxide (TaOx), niobium oxide (NbOx), zirconium oxide (ZrOx), and hafnium oxide (HfOx). Examples of other suitable low refractive index dielectric materials include magnesium fluoride ($MgF_2$), calcium fluoride ($CaF_2$), cryolite ($Na_3AlF_6$), and aluminum oxide ($Al_2O_3$). Furthermore, although described herein as including layers of two materials of different refractive indices, the optical coating may also be comprised of layers that include three materials of differing refractive indices While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A reflector window for use in a light lamp, comprising:
a light transmission window having a center and an outer edge and adapted to receive light from a light source over a range of incident angles that increases from the center to the outer edge; and
an optical coating of at least first and second materials having differing refractive indices deposited on a proximate side of the light transmission window adjacent the light source, the optical coating comprising a plurality of alternating layers of the first and second materials with each layer having a thickness which increases from the center to the outer edge of the light transmission window.

2. The reflector window of claim 1, wherein the optical coating is adapted to receive electromagnetic radiation from the center to the outer edge of the light transmission window, and wherein the optical coating is adapted to reflect the electromagnetic radiation such that a transmitted bandwidth for electromagnetic radiation at each incident angle within the range of incident angles is substantially equal to a desired transmitted bandwidth.

3. The reflector window of claim 2, wherein the range of incident angles is between approximately zero degrees and approximately fifty degrees.

4. The reflector window of claim 1, wherein the thickness of each layer at the outer edge is within a thickness range that is between approximately two percent and twenty percent greater than the thickness at the center.

5. The reflector window of claim 2, wherein the thickness of each layer increases from the center to the outer edge based on the angle of incidence of the electromagnetic radiation.

6. The reflector window of claim 5, wherein the thickness of each layer increases non-linearly from the center to the outer edge.

7. The reflector window of claim 1, wherein the first and second materials comprise dielectric materials with the first material having a refractive index different than a refractive index of the second material.

8. The reflector window of claim 1, wherein the first material is selected from a group consisting of titanium dioxide ($TiO_2$), tantalum oxide (TaOx), niobium oxide (NbOx), zirconium oxide (ZrOx), and hafnium oxide (HfOx).

9. The reflector window of claim 1, wherein the second material is selected from a group consisting of Silicon dioxide ($SiO_2$), magnesium fluoride ($MgF_2$), calcium fluoride ($CaF_2$), cryolite ($Na_3AlF_6$), and aluminum oxide ($Al_2O_3$).

10. The reflector window of claim 1, wherein the light transmission window is substantially glass.

11. A light lamp, comprising:
a light source configured to generate electromagnetic radiation;
a reflector adjacent the light source; and
a light transmission window including a center and an outer edge, and an optical coating of at least first and second materials having different refractive indices deposited on the substrate;
wherein the optical coating of the at least first and second materials have differing refractive indices and are deposited on a proximate side of the light transmission window with respect to the light source, the optical coating comprising a plurality of alternating layers of the first and second materials with each layer having a thickness which increases from the center to the outer edge of the light transmission window; and
wherein the light transmission window is positioned relative to the light source and reflector such that an angle of incidence of electromagnetic radiation upon the optical coating increases over a range of incident angles from the center to the outer edge of the light transmission window.

12. The light lamp of claim 11, wherein the optical coating is adapted to reflect the electromagnetic radiation such that a transmitted bandwidth of electromagnetic radiation at each incident angle within the range of incident angles is substantially equal to a bandwidth of visible portion of the electromagnetic spectrum.

13. The light lamp of claim 12, wherein the range of incident angles is between zero degrees and approximately fifty degrees.

14. The light lamp of claim 11, wherein the reflector is substantially elliptically shaped.

15. The light lamp of claim 11, wherein the thickness of each layer at the outer edge is within a thickness range that is between approximately two percent and fifteen percent greater than the thickness at the center.

16. The light lamp of claim 11, wherein the first and second materials comprise dielectric materials with the first material having a refractive index different than a refractive index of the second material.

17. A method for making a reflector window to receive electromagnetic radiation over a range of incident angles from a center to an outer edge of the reflector window, the method comprising:
providing a light transmission window; and
depositing on the light transmission window a plurality of layers of alternating at least first and second dielectric materials having differing refractive indices, the step including increasing a thickness of each layer from the center to the outer edge of the light transmission window.

18. The method of claim 17, wherein depositing the alternating layers includes providing a number of alternating layers such that a transmitted bandwidth of the reflector for electromagnetic radiation at each incident angle within the range of incident angles is substantially equal to a desired transmitted bandwidth.

19. The method of claim 17, wherein the thickness of each layer proximate to the outer edge of the light transmission window is approximately two percent to approximately fifteen percent greater that the thickness of each layer proximate to the center of the light transmission window.

20. The method of claim 17, wherein depositing the layers includes increasing the thickness of each of the alternating layers from the center to the outer edge of the light transmission window.

21. A reflector window for use in a light lamp, comprising:
a light transmission window having a center and an outer edge; and
an optical coating of at least first and second materials having differing refractive indices deposited on a proximate side of the light transmission window adjacent the light source, the optical coating comprising a plurality of alternating layers of the first and second materials with each layer having a thickness which increases from the center to the outer edge of the light transmission window, wherein the thickness of each layer at the outer edge is within a thickness range that is between approximately two percent and twenty percent greater than the thickness at the center, and wherein the thickness of each layer increases from the center to the outer edge based on the angle of incidence of the electromagnetic radiation.

22. The reflector window of claim 21, wherein the thickness of each layer increases non-linearly from the center to the outer edge.

23. A reflector window for use in a light lamp, comprising:
a light transmission window having a center and an outer edge; and
an optical coating of at least first and second materials having differing refractive indices deposited on a proximate side of the light transmission window adjacent the light source, the optical coating comprising a plurality of alternating layers of the first and second materials with each layer having a thickness which increases from the center to the outer edge of the light transmission window, wherein the first and second materials comprise dielectric materials with the first material having a refractive index different than a refractive index of the second material.

* * * * *